UNITED STATES PATENT OFFICE.

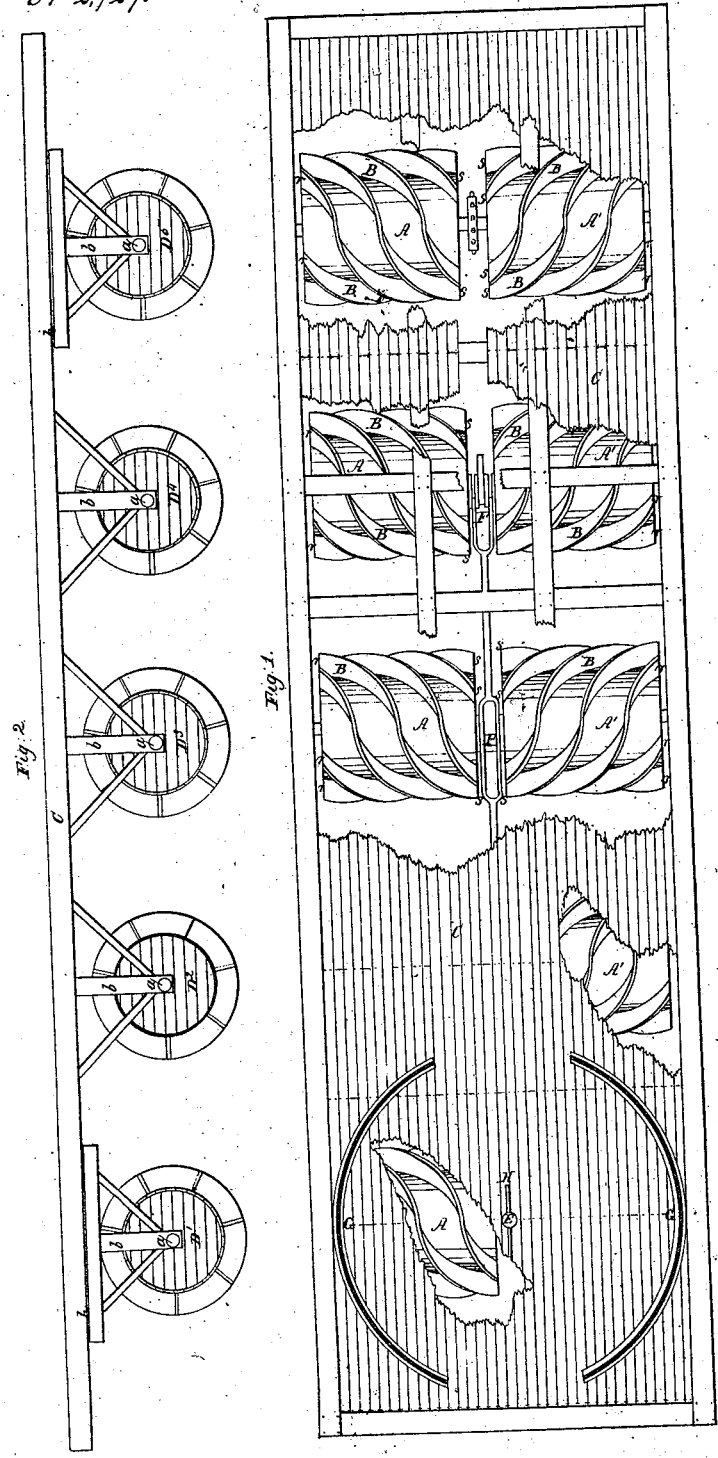

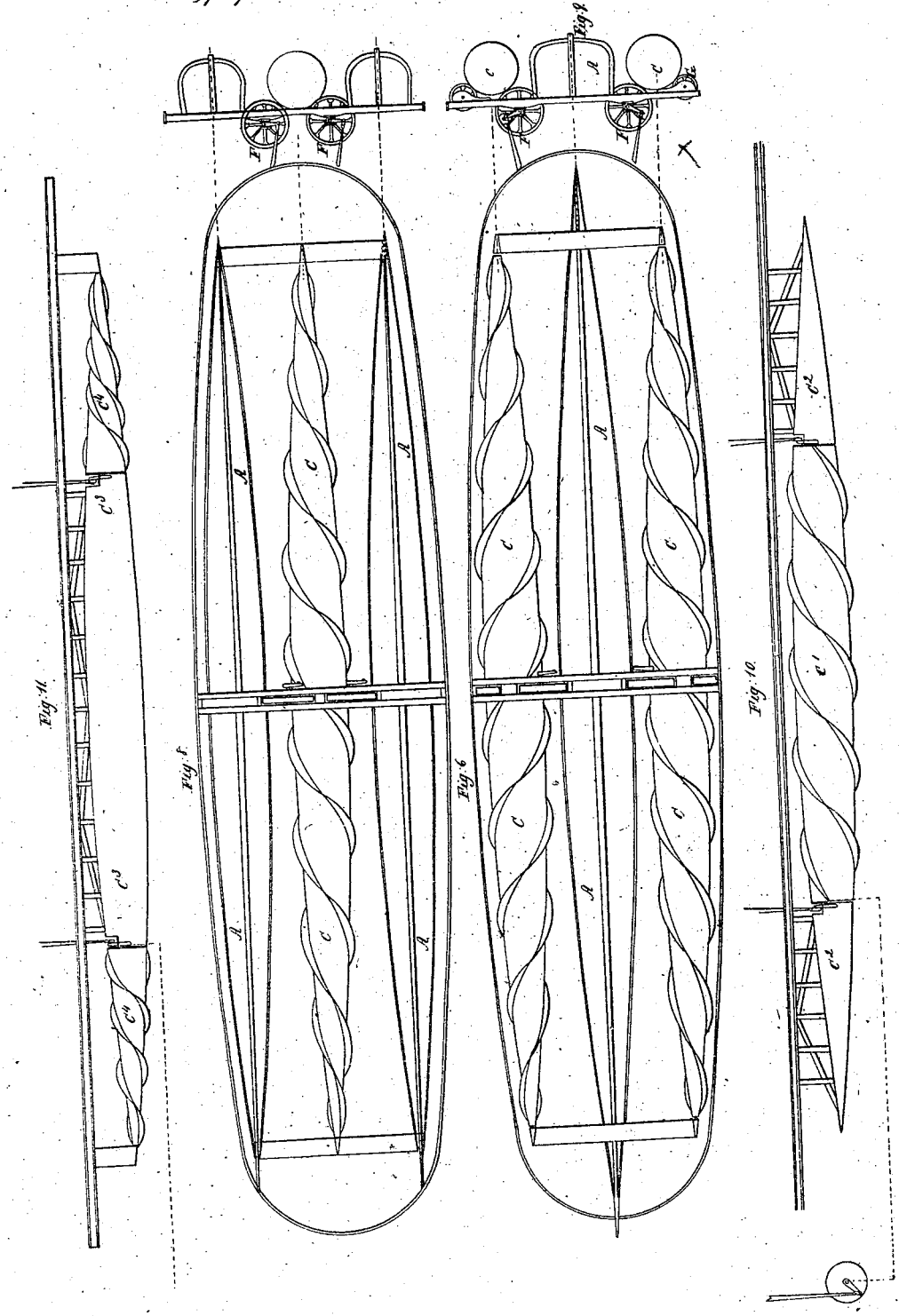

THOMAS L. JONES, OF NEW YORK, N. Y.

IMPROVEMENT IN THE METHOD OF PROPELLING AND STEERING BOATS AND OTHER VESSELS.

Specification forming part of Letters Patent No. 2,727, dated July 16, 1842.

*To all whom it may concern:*

Be it known that I, THOMAS L. JONES, of the city, county, and State of New York, have invented a new and useful Improvement in the Mode of Building and Propelling Vessels, of which the following is a full and accurate description, reference being had to the accompanying drawings, making part of this specification.

My invention consists in the employment of a series of revolving cylinders placed transversely under a vessel for the purpose of sustaining and propelling her, the cylinders being provided with paddles placed spirally on their surface, as hereinafter described, constituting the important feature of my invention. The platform or bottom of the vessel is supported on the journals of these cylinders, and is consequently elevated above the water, the cylinders alone being in contact with it.

In Figure 1, A A' are the revolving cylinders as seen from above, the platform C being broken away to allow of their being seen. Two cylinders A and A', it will be seen, are placed in a continuous line on each shaft, but at a sufficient distance apart to allow of a crank being placed on the shaft between them. By means of connecting-rods attached to which cranks the several shafts are coupled together and motion communicated from one set of cylinders to the other. Instead of having two short cylinders, however, one long one may be used, in which case the coupling must be effected by means of cranks and connecting-rods on the ends of the shafts.

In Fig. 2 the mode of supporting the platform C, Fig. 1, is shown, D' D² D³ D⁴ D⁵ being the outer ends of the cylinders A A' in Fig. 1, and $a\ a$ the ends of the shafts of said cylinders having their bearings in vertical supports $b\ b$, descending from the bottom of the platform C, and sustaining said platform by means of these supports. The cylinders, as already stated, are provided with paddles, which are arranged in a spiral manner upon them, beginning at the end $r$ of the cylinder, but not extending around it, as a line drawn from the point $s$, where the paddle terminates, along the surface of the cylinder to the opposite end or head, so as to meet the latter at a right angle, will only include between it and the point $r$ an arc of about one hundred and twenty degrees of the circle formed by said end or head.

The paddles upon the cylinders A A', it will be seen, wind upon them in a reverse direction toward each other from the ends of the cylinders. Where the cylinders are continuous from side to side of the vessel, the paddles wind in a similar manner from each end to the middle of the cylinder, the object of this reverse arrangement being to give an equal propulsion to each side of the vessel and crowd the water at the same time toward the middle of the cylinders, so as to lift them in a considerable degree from the water and increase their effect.

I steer my ship or other floating body by means of the fore and aft or first and last cylinders in the series D' and D⁵ in Fig. 2, or by either of them, as hereinafter described. The uprights or supports $b\ b$, Fig. 2, on which the shafts of these cylinders have their bearings, instead of being attached to the platform C above them, as in the other cylinders, are fastened at their upper ends to a movable horizontal frame placed immediately below said platform, as shown in Fig. 3, where $ff$ is the frame referred to, supported by the uprights $b\ b$ on the end of the shaft of the cylinder D⁵, a part of the frame and cylinder and one of the uprights $b$ being shown in dotted lines, a portion of the deck being removed to show the remainder. From each of the outer angles of this frame $ff$ rods $e\ e$ project horizontally, and on these friction-rollers $g\ g$ are placed, the rods $e\ e$ serving as their axes. The frame $ff$ so constructed is supported under the platform C' by means of a circular railway $k$, on which the rollers $g\ g$ traverse, $k$ being the circular railway, which is merely an annular track surrounded by a vertical rim $h$, against the inside of which a set of horizontal rollers $n\ n$, supported on vertical pins passing through the ends of the rods $e\ e$, press with their peripheries to prevent any lateral vibration of the frame $ff$.

The arrangement described allows the steering-cylinders D' D⁵, or either of them, to traverse in any direction for steering the vessel, while the propelling-power of said cylinders continues undiminished. To propel the steering-cylinders, which are not connected with the other cylinders of the series, a vertical rod is attached to the crank on the middle of the shaft carrying the cylinders $D^5$, as shown by dotted lines in Fig. 3, where $o$ is the crank and $t$ the rod referred to, which is connected at its upper end by a swivel-joint $i$ (shown also in dotted lines) to a vertical connecting-rod $w$, passing through the deck, to the upper end of which the power is communicated in any convenient manner. Instead of the rod $w$, provided with a swivel-joint, as described, and connected to the crank $o$, I sometimes intend using a belt, employing in this case, instead of a crank between the cylinders, a drum upon the shaft for the belt to pass over. When a belt is used, it will pass up through the deck in the same manner that the rod $w$ does, and will be connected there to another drum for operating it. The object of the swivel-joint $i$, referred to above, is to allow of the rod $w$ remaining in a vertical position while the cylinder traverses in steering the vessel.

In steering with the cylinders I cause them to traverse by making use of ropes or chains passing through blocks $y$ on the frame $ff$ in the same manner that they are now used in steering steamboats. Other modes may be made use of; but, as they would be analogous to the one just mentioned, I need not refer to them.

Having described my improvement in the method of constructing and propelling vessels, what I claim as my invention, and desire to secure by Letters Patent, is—

1. Arranging the paddles on the transverse revolving cylinders in series of reversed spirals, as described, so that the current of water thrown by the series on one end shall be met and thrown back by the series on the other end, whether the two series be arranged on one cylinder or on two cylinders upon the same shaft.

2. The mode of steering the vessel by means of the fore and aft or first and last cylinders in the series, or either of them, the same being made movable and caused to traverse, for the purpose, in the manner set forth, or in any other substantially the same.

THOS. L. JONES.

Witnesses:
H. D. ROBINSON,
CHS. M. KELLER.